United States Patent [19]

Gliha

[11] Patent Number: 4,707,049
[45] Date of Patent: Nov. 17, 1987

[54] ELECTRICAL CONNECTOR HAVING TRANSIENT PROTECTION

[75] Inventor: Edward R. Gliha, Bainbridge, N.Y.

[73] Assignee: Amphenol Corporation, Wallingford, Conn.

[21] Appl. No.: 927,196

[22] Filed: Nov. 3, 1986

[51] Int. Cl.⁴ .......................................... H01R 13/66
[52] U.S. Cl. ...................................... 439/620; 357/55
[58] Field of Search .................. 357/55; 333/181, 182, 333/183, 184, 185, 12, 17 L, 206, 247; 339/147 R, 147 P; 361/127

[56] References Cited

U.S. PATENT DOCUMENTS 4,587,589  5/1986  Marek ................................. 361/127
4,646,037  2/1987  Turolla et al. ..................... 333/17 L Primary Examiner—Gil Weidenfeld
Assistant Examiner—Gary F. Paumen
Attorney, Agent, or Firm—Bacon & Thomas

[57] ABSTRACT

A cylindrical diode is terminated to a contact and mounted in a cylindrical countersunk recess of a dielectric insert mounted in a metal connector shell, the connector having an arrangement for grounding the contact to said shell. The diode has a first electrode defining a top face generally coplanar with the insert, a second electrode defining a bottom face, a silicon chip sandwiched between the electrodes, and a circular hole extending between its end faces and circumposed around said contact.

8 Claims, 4 Drawing Figures

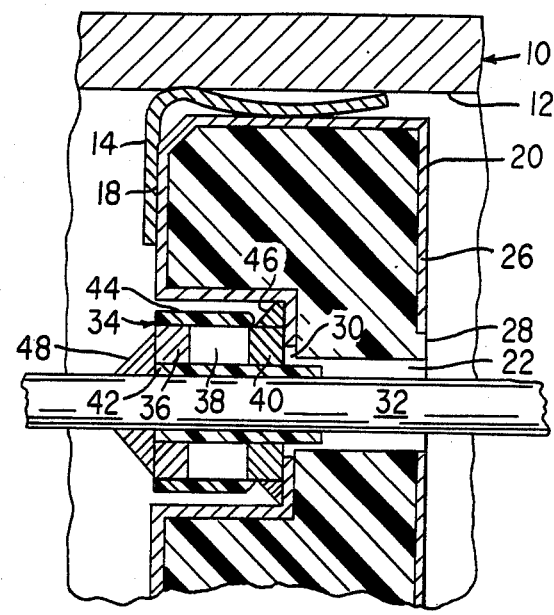
FIG. 1
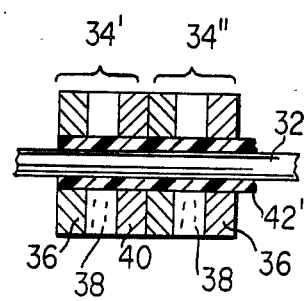
FIG. 4
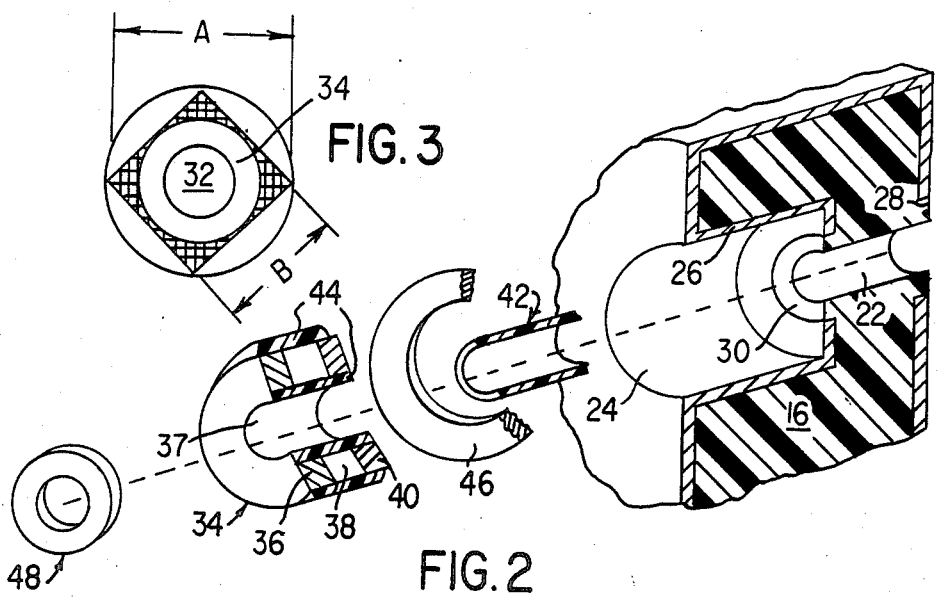
FIG. 3
FIG. 2

ELECTRICAL CONNECTOR HAVING TRANSIENT PROTECTION

This invention relates to an electrical connector having transient protection.

Connector assemblies typically include a dielectric insert for carrying a plurality of contacts, the insert having an array of passages extending therethrough each passage oftentimes having a cylindrical cross-section for receiving an electrical contact having a cylindrical cross-section. Molding a passage with a cylindrical cross-section is less costly than to mold other cross-sections and maximizes the insulation between contacts to provide electrical insulation for the least amount of material. Densification of contacts is maximized by arranging passages such that their axes form the apexes of equilateral triangles.

To protect electrical systems from unwanted signals passing through the contact it is known to encapsulate a tubular ceramic capacitor around the contact. This configuration desirably takes advantage of cylindrical passages. With the advent of solid state electronics a serious concern has developed regarding the effects of electromagnetic pulses (EMP), electrostatic discharges (ESD) and lightning. In this regard fast rise silicon diodes are known to be suitable for protecting against these transients.

However presently available silicon diodes comprise a chip or "die" of silicon which is not formed but "grown" from a monocrystalline piece of pure silicon. Because the manufacturer takes a sheet of silicon so grown and saws it into squares for use by industry the silicon diode is referred to as being epitaxial or planar. That is, the silicon does not come in cylindrical form. The square form does not enhance its use in connectors having cylindrical passages.

It would be desirable to have a silicon diode which is cylindrical and has a circular hole extending through its geometric center for passing an electrical contact. When packaged inside the electrical connector this arrangement will prevent transient signals from passing through the connector and allow the connector to carry the greatest number of contacts.

An electrical connector herein includes a metal shell, a dielectric insert mounted in the shell, the insert having a front face, a rear face and a plurality of cylindrical passages extending between the faces, an elongated cylindrical contact in each passage, and a ground plane electrically connecting the contacts to the shell.

In particular, the insert is removably insertable into the shell and selectively conductively plated to comprise part of the ground plane. An array of countersunk recesses extend inwardly from one end face each recess forming a coaxial extension for one respective passage, the passage axes defining the apexes of equilateral triangles. A cylindrical silicon diode comprises a circular wafer of silicon being sandwiched between a pair of circular metal electrodes and has a central hole passing therethrough, the hole being sized to fit about the contact and the diode being sized to fit within one countersunk recess, one electrode thereof being for electrical connection to the plating and the other electrode being for electrical connection to the contact.

A sheet of silicon would be provided from which a laser cutter would cut the sheet into desired circular wafer having a central circular hole.

Advantageously the diodes are soldered to the selective external plating on the insert and the insert could be removable from the shell. Provision of the countersunk recess allows more efficient packaging of the diodes. The insert could comprise a monolithic planar capacitor whereby both filter and surge protection elements are compactly packaged into one removable assembly. In such monolithic capacitor its active and ground electrodes would be internal with the ground electrodes electrically connected to the plated outer periphery and the active electrodes electrically connected to the contact.

The invention will now be described, by way of example, with reference to the following drawings in which:

FIG. 1 shows a partial cross-section of a connector shell having a bipolar silicon diode.

FIG. 2 shows in isometric and partially sectioned a silicon diode positioned for insertion into its insert without its contact.

FIG. 3 shows the additional room available using a circular silicon diode.

FIG. 4 shows a unipolar silicon diode partially sectioned.

Turning now to the drawings, FIG. 1 shows a connector assembly including a hollow cylindrical metal shell 10 having an inner wall 12, a dielectric insert 16 having a passage 22 extending therethrough and mounted in the shell, one of a plurality of electrical contacts 32 each passing through the assembly and mountable in one respective passage, and a ground plane 14. The insert 16 is selectively plated at 26 to complete an electrical circuit path between the contacts, the ground plane and the shell.

The contact 30 is axially elongated and is generally cylindrical in cross-section.

The insert 16 is generally cylindrical and has a top face 18, a bottom face 20 and an array of passages 22 extending between the faces. Each passage is generally cylindrical in cross section whereby to pass a contact with a clearance fit. A cylindrical bore 24 coaxial with the passage axis extends inwardly from the top face to define a countersunk recess. The insert is plated with electrically conductive metal everywhere except on an annulus 28 where the passage opens onto the bottom face and on an annulus 30 where the passage opens into the recess.

A silicon diode 34 comprises a silicon body 38 sandwiched between a pair of metal plates 36, 40 each plate forming an electrode, the diode being cylindrical and having a hole 37 extending through its geometric center for passing the contact and its outer periphery being sized to fit within the recess 24. The diode shown is a bipolar diode.

To complete an electrical path to the shell 10 and the contact 32, a grounding spring 14 circumposes the outer periphery of the insert 16 whereby to make electrical contact with the plating 26 on the insert periphery and the shell inner wall 12.

A first solder washer 46 completes and electrical path between the recess and the electrode 40 and a second solder washer 48 completes an electrical path between the other electrode 36 and the contact 32.

FIG. 2 shows in isometric and partially sectioned the silicon diode 34 positioned for insertion into the recess 24 of its insert without its contact. The first solder washer 48 completes an electrical circuit path with the first electrode 36 and the contact and the second solder washer 46 makes an electrical circuit path with the plated recess and the second electrode 40. The contact will have a sleeve 42 of insulation therearound to insulate the electrodes from one another. Further, a dielectric coating 44 is applied to the inner and the outer periphery of the diode 34 to insulate the electrodes from the plated wall of the countersunk recess.

FIG. 3 shows the additional room available using a circular silicon diode. The dimension "A" repesents the diameter needed if a square silicon diode was used. The dimension "B" represents the diameter of a circle inscribed inside the square and the shaded triangular areas the savings in space by utilizing a cylindrical silicon diode. The central hole represents the outer diameter of a contact 32 and the intermediate annulus represents the space occupied by the cylindrical diode 34.

The sheet of silicon would be cut by a laser so that to form circular wafers each having a circular opening and a circular periphery about the geometric axis of the silicon so cut.

FIG. 4 shows a unipolar silicon diode partially sectioned an comprises a first and a second silicon diode (like above described being abutted about the contact. As shown, diodes 34' and 34" are abutted and insulated from the contact by an insulative sleeve 42'.

Having described the invention what is claimed is:

1. An electrical connector having a metal shell, a dielectric insert having a passage of cylindrical cross-section mounted in said shell, a contact disposed in said passage, and means for grounding the contact to said shell, characterized by
   a cylindrical diode mounted in said passage and having a first electrode defining a top face, a second electrode defining a bottom face, a silicon chip sandwiched between the electrodes, and a circular hole extending between its end faces and circumposed around said contact, and
   circuit path means for completing a first and a second electrical circuit path, said first electrical circuit path being between the first electrode and the contact and the second electrical circuit path being between the second electrode and the grounding means.

2. The electrical connector as recited in claim 1 wherein said second circuit path comprises said insert being selectively conductively plated and in electrical circuit path relation to said ground plane, said selective plating not being in contact with the first electrode.

3. The electrical connector as recited in claim 2 wherein the insert comprises a cylindrical disc having a a front and a rear end face, and a cylindrical bore extends inwardly from one end face of the insert, the bore being coaxially aligned with the passage axis and defining a countersunk recess sized to receive said silicon diode.

4. The electrical connector as recited in claim 3 wherein the countersunk recess is conductively plated except for an annular margin circumjacent to the passage and has a depth sufficient to position the first electrode so as to be in a plane substantially including the one face of the insert.

5. The electrical connector as recited in claim 1 wherein said diode includes a means for insulating the electrodes from one another.

6. The electrical connector as recited in claim 5 wherein the means for insulating comprises a first and a second sleeve of dielectric material one sleeve being sandwiched between the contact outer periphery and encircling the electrodes and the other sleeve encircling the outer circumference of the diode.

7. The electrical connector as recited in claim 1 wherein a first and a second circular solder washer are provided each electrically connected respectively to the first and the second electrodes.

8. The electrical connector as recited in claim 1 wherein said diode is electrically connected to said ground plane.

* * * * *